(12) United States Patent
Morand et al.

(10) Patent No.: US 6,974,029 B2
(45) Date of Patent: Dec. 13, 2005

(54) CASSETTE FOR DISPENSING PLEATED TUBING

(75) Inventors: Michel Morand, Montréal (CA); Claude Maufette, Montréal (CA); Maurice Pinsonnault, Montréal (CA)

(73) Assignee: Moniteurs Angelcare Inc., Ile-des-Soeurs (CA)

( * ) Notice: Subject to any disclaimer, the term of this patent is extended or adjusted under 35 U.S.C. 154(b) by 140 days.

(21) Appl. No.: 10/294,101

(22) Filed: Nov. 14, 2002

(65) Prior Publication Data

US 2003/0121923 A1 Jul. 3, 2003

(30) Foreign Application Priority Data

Dec. 31, 2001 (CA) .............................................. 2366384
May 22, 2002 (CA) .............................................. 2387183

(51) Int. Cl.[7] .......................... B65D 85/02; B65B 43/28
(52) U.S. Cl. ........................... 206/303; 53/459; 53/567; 53/576; 220/908.1
(58) Field of Search ................................ 206/303, 397, 206/409, 446, 802; 53/459, 567, 576; 220/212, 780, 988, 908.1, 495.11, 495.07, 495.08

(56) References Cited

U.S. PATENT DOCUMENTS

| 3,452,368 | A | * | 7/1969 | Couper ........................ 53/567 |
| 3,536,192 | A | * | 10/1970 | Couper ........................ 206/303 |
| 4,869,049 | A | | 9/1989 | Richards et al. |
| 4,934,529 | A | | 6/1990 | Richards et al. |
| 5,056,293 | A | | 10/1991 | Richards et al. |
| 5,590,512 | A | * | 1/1997 | Richards et al. .............. 53/567 |
| 5,813,200 | A | * | 9/1998 | Jacoby et al. ................. 53/567 |
| 6,065,272 | A | * | 5/2000 | Lecomte ....................... 53/576 |
| 6,128,890 | A | * | 10/2000 | Firth ............................ 53/567 |
| 6,170,240 | B1 | * | 1/2001 | Jacoby et al. ................. 53/567 |
| 6,370,847 | B1 | * | 4/2002 | Jensen et al. ................. 53/459 |
| 6,719,194 | B2 | * | 4/2004 | Richards ...................... 53/567 |
| 6,722,107 | B2 | * | 4/2004 | Morand ....................... 53/459 |

FOREIGN PATENT DOCUMENTS

| EP | 303517 | 2/1989 |
| EP | 353922 | 2/1990 |
| EP | 404484 | 12/1990 |
| EP | 699584 | 3/1996 |
| WO | 9817536 | 4/1998 |

\* cited by examiner

Primary Examiner—Luan K. Bui

(57) ABSTRACT

A cassette for use in dispensing a pleated tubing to collect waste material is formed of an annular body having a U-shaped cross-section in which is packed the pleated tubing in layered form and of an annular flange which extends over the housing. The flange has an inner portion that extends downwardly to engage the upper part of the inner wall of the annular body and an outwardly projecting portion that extends over the housing. The outwardly projecting portion has an annular funnel area to assist in the sliding of the pleated tubing when pulled through the central core of the annular body.

7 Claims, 4 Drawing Sheets

CASSETTE FOR DISPENSING PLEATED TUBING

FIELD OF THE INVENTION

The present invention pertains to a cassette used for dispensing a pleated tubing contained therein.

This type of cassette may be used with other components to form an apparatus, such as a kitchen furniture, to collect waste refuse which can be disposed in packages collected in a tubular tubing. When all the packed pleated tubing is used, the cassette can be removed and replaced with a similar full cassette.

DESCRIPTION OF THE PRIOR ART

One example of such cassette may be found described in U.S. Pat. No. 4,934,529 issued Jun. 19, 1990 to Richards et al. This cassette may be used with an apparatus particularly applicable to the disposal of waste material such as that described in U.S. Pat. No. 4,869,049 issued Sep. 26, 1989 to Richards et al.

The cassette consists of a rigid body formed by a central tubular core and a surrounding casing wall positioned to provide an annular space between the core and the casing wall. The resilient flexible tubing is packed in the annular space and is covered by a cap which is axially movable in the casing. The cap extends radially from the outer casing wall to a location that provides a gap between the inner edge of the cap and the tubular central core of the casing. The tubing is dispensed by passing from the pack over the top edge of the central core and then down through the core. The casing outer wall has detent means which limit the axial movement of the cap away from the pack.

SUMMARY OF THE INVENTION

An object of the present invention is to provide a novel cassette for use in dispensing a pleated tubing contained therein. This is achieved by the assembly of an annular body and of an annular flange. The construction of the flange is such as to provide a funnel effect for the tubing as it is pulled downwards in the central core of the annular body.

The present invention therefore relates to a cassette for use in the dispensing of a pleated tubing which comprises:

an annular body having a U shaped cross-section defined by an inner wall, an outer wall and a bottom wall joining a lower part of the inner and outer walls; the walls defining a housing in which the pleated tubing is packed in layered form; and an annular flange extending over the housing; the flange having an inner portion extending downwardly and engaging an upper part of the inner wall of the body and an outwardly projecting portion extending over the housing; the projecting portion having an outer edge distanced from an upper edge of the outer wall of the body so as to leave a peripheral gap to allow passage of the tubing therebetween; the outwardly projecting portion having an inclined annular area defining a funnel to assist in sliding the tubing when being pulled through a central core which is defined by the inner wall of the body and the downwardly projecting portion of the flange.

In one form of the invention, the portion extending over the housing includes a tear-off outwardly projecting section that engages an upper part of the outer wall of the annular body. The tear-off section, when torn off, leaves a peripheral gap to allow passage and access of the tubing therebetween.

In another form of the invention, cooperating inter-engagement means are provided on the upper part of the body and on opposite edges of the cover to lock the cover to the body. These inter-engagement means consist of lips on the inner wall of the cover that engage corresponding upper edges of the annular body.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

DESCRIPTION OF PREFERRED EMBODIMENTS

Figure 1:
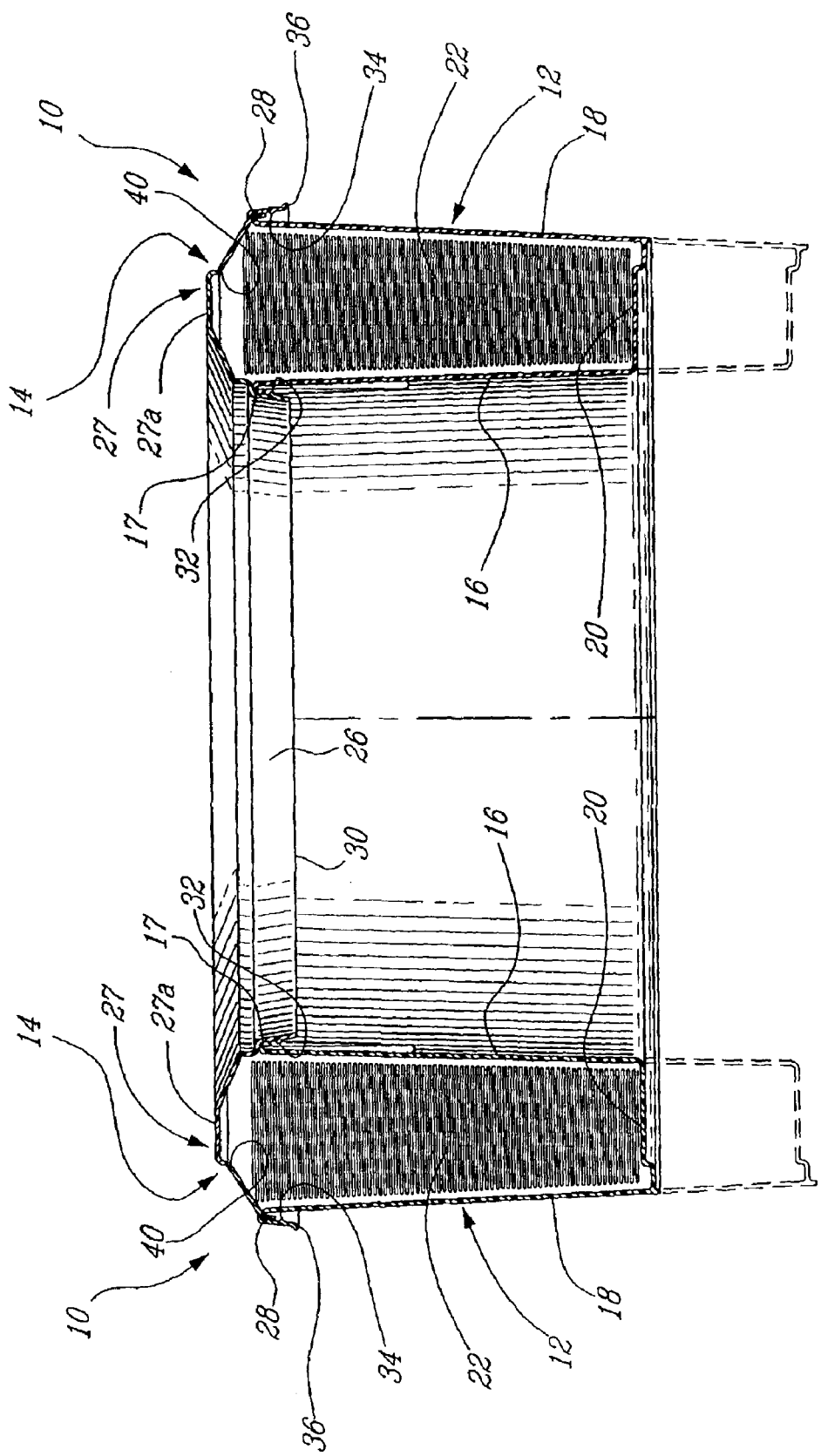
FIG. 1 is an elevational cross-section of one embodiment of a cassette made in accordance with the present invention, showing its use with and without the tear-off section.
Figure 2:
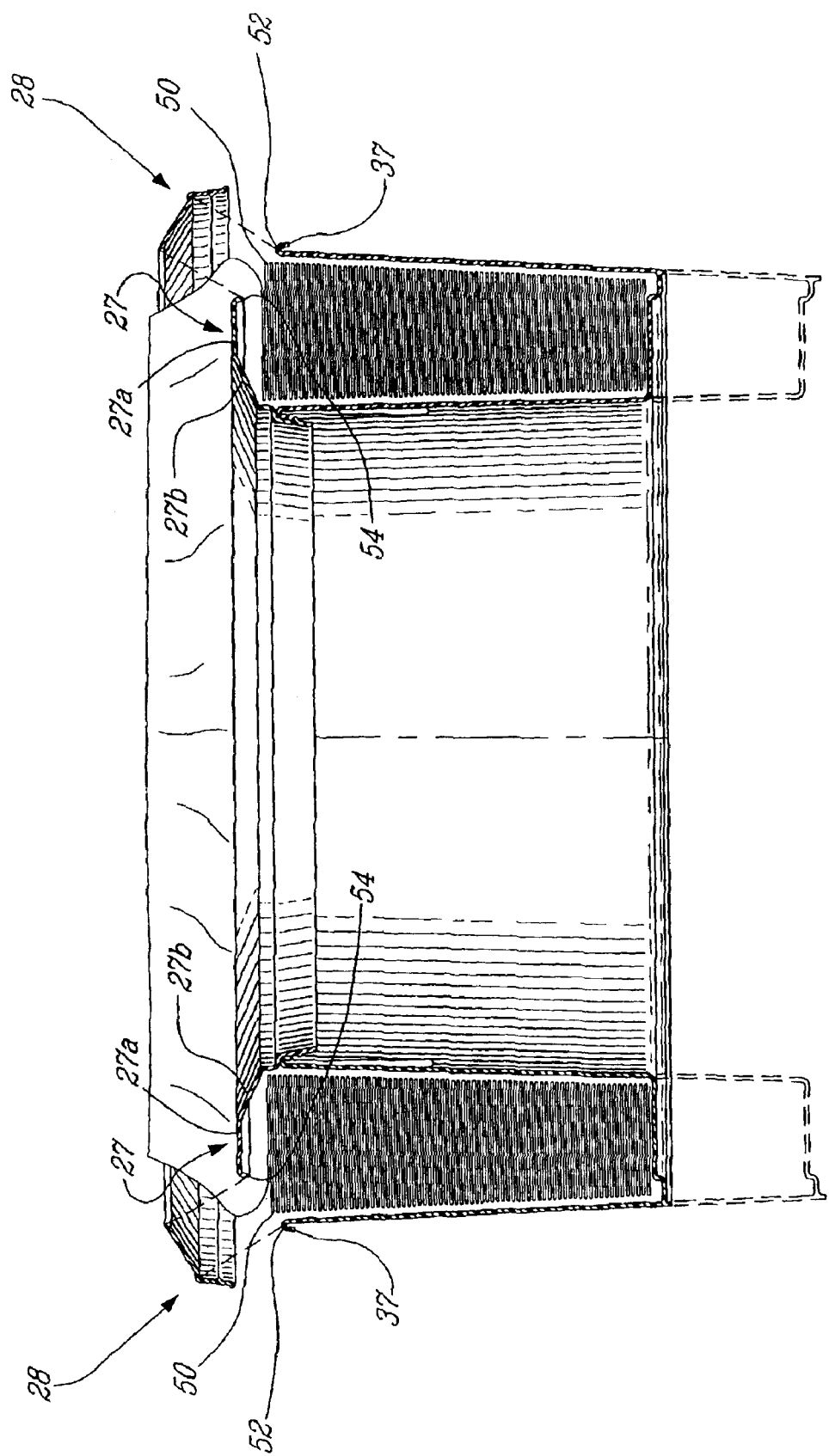
FIG. 2 is an elevational cross-section view thereof showing its use with the tear-off section removed.

Referring to FIG. 1, there is shown a cassette, generally denoted 10, consisting of two parts 12 and 14.

Part 12 consists of annular body having a U-shaped cross-section which is defined by an inner wall 16, an outer wall 18 and a bottom wall 20, the latter joining the lower part of the inner and outer walls, thus defining a housing in which a pack 22 of pleated tubular tubing is received. The inner wall of the annular body defines a central core.

Part 14 of the cassette consists of an annular cover that extends over the housing of body 12. The cover has an inner portion 26 that extends downwardly in the core and engages the upper part of the inner wall. The cover 14 also includes a top portion 27, with an outwardly projecting section 28, that extends over the housing of the annular body. The top portion 27 is formed of a flat area 27a and a funnel shaped inner area 27b, the function of which will be described hereinbelow.

The lower edge 30 of the downwardly extending portion 26 of the flange has an annular inner lip 32 that engages under the downturned edge 17 of the annular body 12.

The annular body 12 and the cover 14 are lockingly engaged initially to one another (as seen on the left side of FIG. 1) by means of the cooperation of the inner lip 32 as described above and by an annular lip 34 adjacent edge 36 of section 28 which engages the upper downturned edge 37 of the annular body 12.

The use of the cassette 10 of the present invention with a pack of pleated tubing 22 received in its housing will now be described. The outwardly projecting section 28 has an area 40 of reduced section connecting it to the top area 27a to weaken the material and allow it to be torn-off (as seen on the right-side of FIG. 1). Then, the upper end of the tubing is retrieved from its housing through the gap 50 existing between the top peripheral edge 52 of the body and the opposite smooth peripheral edge 54 of the cover. A knot (not shown) is made to close one end of the tubing. The knotted end is then pulled down through the central core of the cassette, the tubing sliding along the annular smooth edge 54 of the cover over the flat area 27a and along the funnel area 27b into the central core.

The tubing may be formed of a barrier film to provide an enclosure to seal odors of the waste material.

The cover and the annular body are formed, preferably, of resilient plastic material to enable a snap fit to one another as well as to facilitate the tearing procedure. In one form of the invention, the body is made of polypropylene while the cover is made of polyethylene.

Figure 3:
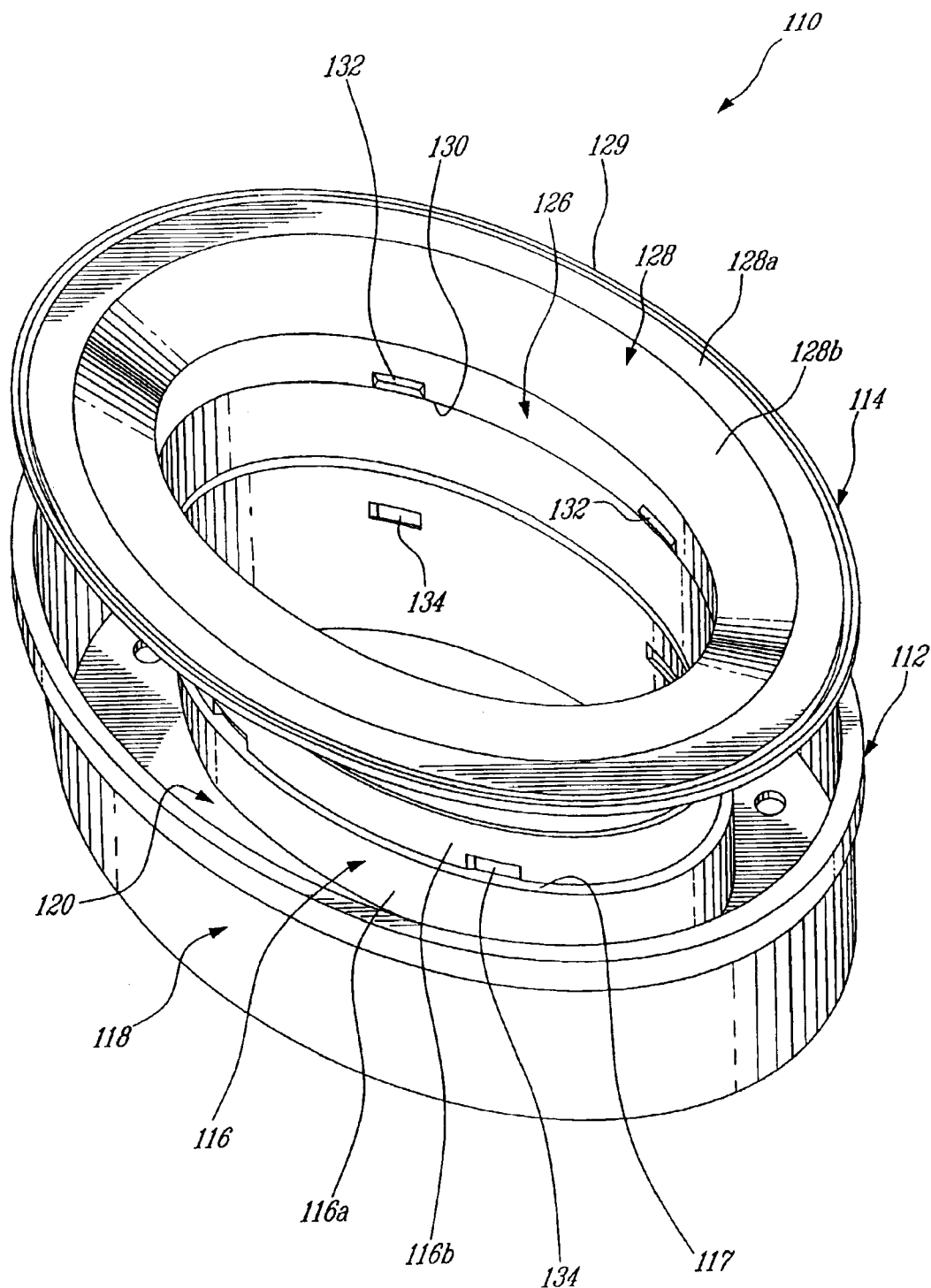
FIG. 3 is an exploded view of another embodiment of a cassette made in accordance with the present invention.

Referring to FIG. 3, there is shown another embodiment of a cassette, generally denoted 110, consisting of two parts 112 and 114.

Part 112 consists of annular body having a U-shaped cross-section which is defined by an inner wall 116, an outer wall 118 and a bottom wall 120, the latter joining the lower part of the inner and outer walls thus defining a housing in which a pack 122 (see FIG. 4) of pleated tubular tubing 124 is received. The annular body has a central core defined by the inner wall 116 which is formed of a lower part 116a and an upper part 116b. Parts 116a and 116b are axially offset to one another to define a shoulder 117.

Part 114 of the cassette consists of an annular flange that extends over the housing of body 112. The flange has an inner portion 126 that extends downwardly and engages the upper part 116b of the inner wall. The flange 114 also includes an outwardly projecting portion 128 that extends over the housing of the annular body. The outwardly projecting portion 128 is formed of a flat area 128a and a funnel shaped area 128b, the function of which will be described hereinbelow.

The lower edge 130 of the downwardly extending portion 126 of the flange rests on the shoulder 117 of the annular body 112.

The annular body 112 and the flange 114 are lockingly engaged to one another by means of the cooperation of a series of tongues 132 having a size and shape to snapingly engage info corresponding openings 134 on the inner wall of the annular body.

Once inter-engaged, the lower part of the inner wall of the annular body is co-planar with the downwardly extending portion of the annular flange so as to provide smooth inner surface for the packed tubing pleated in the housing.

Figure 4:
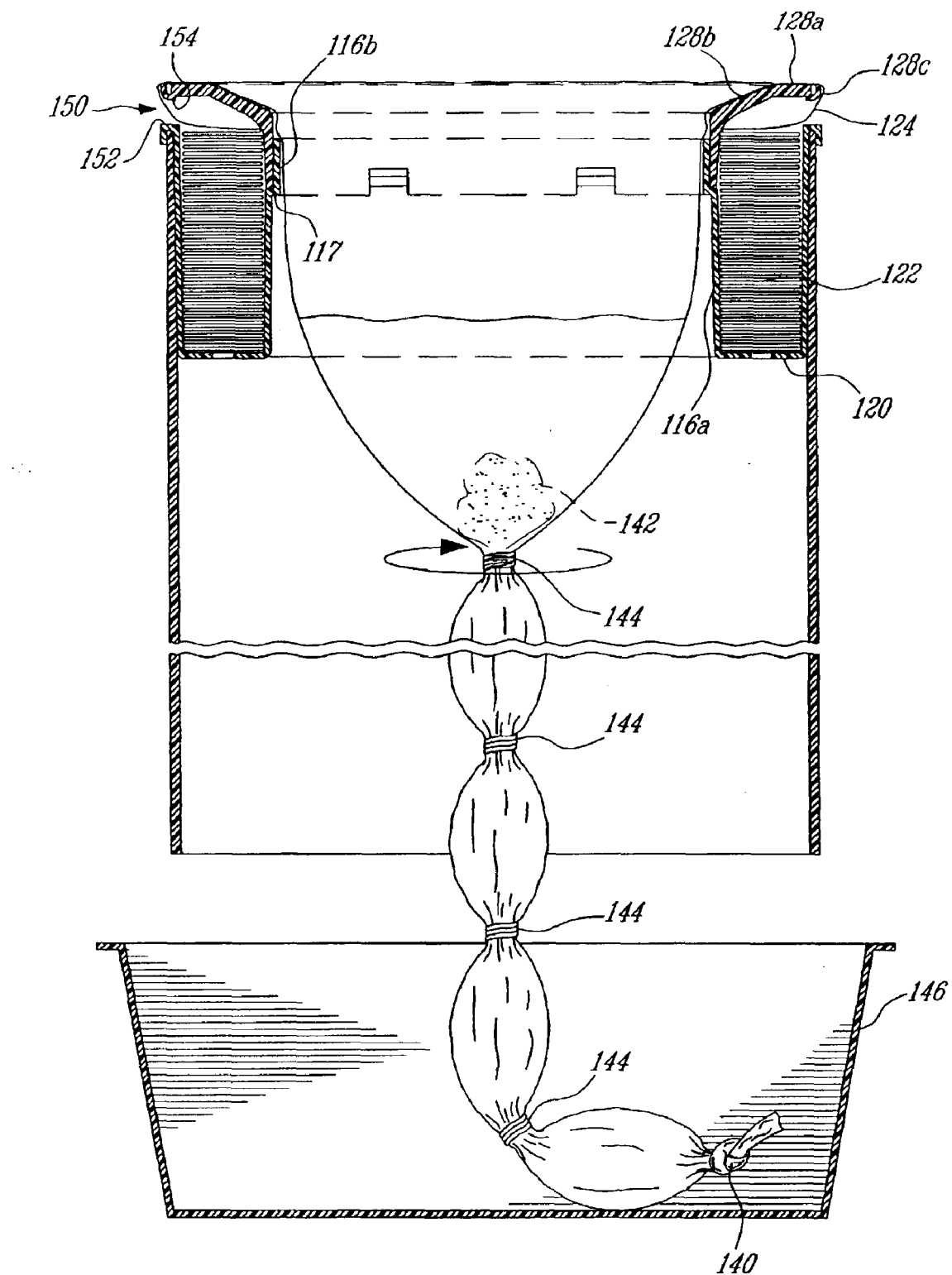
FIG. 4 is an elevational cross-section of the cassette of FIG. 3 showing the use of the pleated tubing.

Referring to FIG. 4, the use of the cassette of the present invention with a pack of pleated tubing received in its housing is schematically illustrated. The tubing is first retrieved from its housing through the gap 150 between the top peripheral edge 152 of the body and the outer smooth peripheral edge 154 of the flange. A knot 140 is made to close one end of the tubing. The knotted end is then pulled down through the central core of the cassette, the tubing sliding along the annular smooth edge 154 of the flange over the flat area 128a and down the funnel area 128b. A waste 142 is placed in the tubing which is then twisted as shown at 144 to seat the enclosed waste. The twisting can be done manually or by other apparatus which does not form part of the present invention.

The tubing may be formed of a barrier film to provide an enclosure to seal odors of the waste material.

As seen in FIG. 4, as more and more of the tubing is used to enclose separate collecting of waste, it is deposited in a container 146.

Among the various types of waste material which can be collected, cat litter is foreseen. Hence, the cassette has been given an oval shape so as to generally conform to the oval shape of a scoop which may be used in the collecting of cat lifter. However, other shapes of cassette are foreseen, such as circular, which could be used to collect disposed baby nappies.

Although the invention has been described above with respect to one specific form, it will be evident to a person skilled in the art that it may be modified and refined in various ways. For example, the tongues of the detent means could be provided on the inner wall of the body with the openings being provided on the downwardly projecting portion of the flange. It is therefore wished to have it understood that the present invention should not be limited in scope, except by the terms of the following claims.

What is claimed is:

1. A cassette for use in dispensing a pleated tubing comprising:

an annular body having a generally U shaped cross-section defined by an inner wall, an outer wall and a bottom wall joining a lower part of said inner and outer walls, said walls defining a housing in which the pleated tubing is packed in layered form;

an annular cover extending over said housing; said cover having an inner portion extending downwardly and engaging an upper part of said inner wall of said body and a top portion extending over said housing; said top portion including a tear-off outwardly projecting section having an outer edge engaging an upper part of said outer wall of said annular body; said tear-off section, when torn-off, leaving a peripheral gap to allow access and passage of said tubing therebetween; said downwardly projecting inner portion having an inclined annular area defining a funnel to assist in sliding said tubing when pulled through a central core defined by said inner wall of said body; and cooperating inter-engagement means on said upper part of said body and on opposite edges of said cover to lock said cover to said body.

2. A cassette as defined in claim 1, wherein said inter-engagement means consist of annular lips on the inner walls of said cover to engage upper edges on said annular body.

3. A cassette as defined in claim 1, wherein said cover has a circumferential area of reduced cross-section to enable tearing off of said outwardly projecting portion.

4. A cassette as defined in claim 1, wherein said cover is made of resilient plastic material to enable a snap fit of said cover to said annular body.

5. A cassette as defined in claim 1, wherein said body and said cover have an oval shape.

6. A cassette as defined in claim 1, further comprising a pack of pleated tubing in said housing.

7. A cassette as defined in claim 1, wherein said tubing is formed of a barrier film.

* * * * *